United States Patent
Fu et al.

(10) Patent No.: US 12,477,522 B2
(45) Date of Patent: Nov. 18, 2025

(54) RANDOM ACCESS RESOURCE DETERMINATION METHOD AND APPARATUS, COMMUNICATION DEVICE, AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 318 days.

(21) Appl. No.: 18/073,706

(22) Filed: Dec. 2, 2022

(65) Prior Publication Data

US 2023/0104067 A1 Apr. 6, 2023

Related U.S. Application Data

(63) Continuation of application No. PCT/CN2020/101963, filed on Jul. 14, 2020.

(51) Int. Cl.
*H04W 74/08* (2024.01)
*H04W 72/04* (2023.01)
*H04W 74/0833* (2024.01)

(52) U.S. Cl.
CPC ....... *H04W 72/04* (2013.01); *H04W 74/0833* (2013.01)

(58) Field of Classification Search
CPC ... H04W 48/18; H04W 72/04; H04W 74/006; H04W 74/0833
See application file for complete search history.

(56) References Cited

U.S. PATENT DOCUMENTS

| 2017/0367036 A1 | 12/2017 | Chen et al. |
| 2017/0367120 A1 | 12/2017 | Murray et al. |
| 2018/0368179 A1 | 12/2018 | He et al. |

(Continued)

FOREIGN PATENT DOCUMENTS

| CN | 106851589 A | 6/2017 |
| CN | 107343306 A | 11/2017 |

(Continued)

OTHER PUBLICATIONS

Supplementary European Search Report in the European application No. 20944876.0, mailed on Apr. 18, 2023. 11 pages.

(Continued)

*Primary Examiner* — Brian D Nguyen
(74) *Attorney, Agent, or Firm* — BAYES PLLC

(57) ABSTRACT

A random access resource determination method and apparatus, a communication device, and a storage medium are provided. The method is applied to a terminal device. The method comprises: receiving random access configuration information, the random access configuration information being used to indicate that a random access resource is allocated according to a network slice or an object that has mapping with the network slice; and determining the random access resource according to the random access configuration information, the random access resource matching a target network slice to be accessed by a terminal device.

20 Claims, 15 Drawing Sheets

(56) References Cited

U.S. PATENT DOCUMENTS

| | | | |
|---|---|---|---|
| 2018/0368205 A1* | 12/2018 | Park | H04W 76/32 |
| 2019/0053193 A1* | 2/2019 | Park | H04W 76/11 |
| 2019/0098672 A1 | 3/2019 | Murray et al. | |
| 2019/0174536 A1 | 6/2019 | Han et al. | |
| 2019/0364495 A1 | 11/2019 | Mildh et al. | |
| 2020/0022038 A1 | 1/2020 | Han et al. | |
| 2020/0252976 A1 | 8/2020 | Murray et al. | |
| 2021/0105702 A1 | 4/2021 | Jiang | |
| 2022/0191961 A1* | 6/2022 | Qiu | H04B 7/0695 |
| 2023/0029004 A1* | 1/2023 | Gao | H04W 48/12 |
| 2024/0373475 A1* | 11/2024 | Farag | H04L 27/261 |

FOREIGN PATENT DOCUMENTS

| | | |
|---|---|---|
| CN | 107734708 A | 2/2018 |
| CN | 107872884 A | 4/2018 |
| CN | 109121468 A | 1/2019 |
| CN | 109845338 A | 6/2019 |
| CN | 110741717 A | 1/2020 |
| CN | 113498208 A | 10/2021 |
| EP | 3641433 A1 | 4/2020 |

OTHER PUBLICATIONS

Xiaomi: "Visibility of Slicing to UE", 3GPP Draft; R2-1702529 Visibility of Slicing to UE, 3rd Generation Partnershipproject (3GPP), Mobile Competence Centre; 650, Route Des Lucioles ; F-06921 Sophia-Antipolis Cedex; France vol. RAN WG2, No. Spokane, USA; 20170403-201704073 Apr. 2017 (Apr. 3, 2017), XP051244545. 5 pages.

Second Office Action of the European application No. 20944876.0, issued on Feb. 28, 2024, 6 pages.

International Search Report in the international application No. PCT/CN2020/101963, mailed on Apr. 16, 2021.

Written Opinion of the International Search Authority in the international application No. PCT/CN2020/101963, mailed on Apr. 16, 2021.

First Office Action of the European application No. 20944876.0, issued on Sep. 20, 2023, 5 pages.

First Office Action of the Chinese application No. 202310196254.4, issued on Apr. 22, 2025. 52 pages with English translation.

3GPP TSG-RAN WG2 #97 R2-1700998, Athens, Greece, Feb. 13-17, 2017, Agenda Item: 10.4, Source: Xiaomi, Title: PRACH partitioning, access and congestion control Consideration for Network Slicing, Document for: Discussion and Decision, pp. 1-3.

3GPP TSG RAN WG3 Meeting #92 R3-161107, Nanjing, China, May 23-27, 2016, Agenda item: 10.2.3, Source: ZTE, Title: Network Slice Selection Procedure, Document for: Discussion and Decision, pp. 1-4.

3GPP TSG-RAN WG2 Meeting #98 R2-1704909, Hangzhou, P.R. China, May 15-19, 2017, Agenda Item: 10.3.1.4, Source: InterDigital Inc., Title: PRACH Resources for NR, Document for: Discussion, Decision, pp. 1-2.

Decision of Rejection of the Chinese application No. 202310196254. 4, issued on Aug. 25, 2025.

\* cited by examiner

| R | Timing Advance Command | | Oct 1 |
|---|---|---|---|
| Timing Advance Command | | UL Grant | Oct 2 |
| UL Grant | | | Oct 3 |
| UL Grant | | | Oct 4 |
| UL Grant | | | Oct 5 |
| Temporary C-RNTI | | | Oct 6 |
| Temporary C-RNTI | | | Oct 7 |

FIG. 2

RANDOM ACCESS RESOURCE DETERMINATION METHOD AND APPARATUS, COMMUNICATION DEVICE, AND STORAGE MEDIUM

CROSS-REFERENCE TO RELATED APPLICATION

The present disclosure is a continuation application of International Application No. PCT/CN2020/101963, filed on Jul. 14, 2020. The disclosure of the above application is hereby incorporated by reference in its entirety.

TECHNICAL FIELD

The present disclosure relates to the field of wireless communication, in particular to a method and apparatus for determining a random access resource, a communication device and a storage medium.

BACKGROUND

The terminal device needs to perform random access in the situations of transmitting uplink data, receiving downlink data, updating tracking area, and the like.

The random access includes two types: collision-based random access process and collision-free random access process. In the collision-based random access process, multiple terminal devices may try to access the network on the same random access resource, so that the situation of the random access collision occurs among terminal devices.

How to reduce the probability of random access collision when determining the random access resource, the related technology has not yet given a suitable solution.

SUMMARY

The present disclosure relates to the field of wireless communication, in particular to a method and apparatus for determining a random access resource, a communication device and a storage medium.

According to one aspect of the present disclosure, a method for determining a random access resource is provided. The method is applicable for a terminal device and the method includes the following operations.

Random access configuration information is received. The random access configuration information is used for indicating that random access resources are allocated according to network slices or objects having a mapping relationship with the network slices.

A random access resource is determined according to the random access configuration information, and the random access resource is matched with a target network slice to be accessed by the terminal device.

According to one aspect of the present disclosure, a method for determining a random access resource is provided. The method is applicable for a network device and the method includes the following operations.

Random access configuration information is transmitted. The random access configuration information is used for indicating that random access resources are allocated according to network slices or objects having a mapping relationship with the network slices.

The random access configuration information is used for a terminal device to determine the random access resource, and the random access resource is matched with a target network slice to be accessed by the terminal device.

According to one aspect of the present disclosure, an apparatus for determining a random access resource is provided. The apparatus includes a receiving module and a determining module.

The receiving module is configured to receive random access configuration information. The random access configuration information is used for indicating that random access resources are allocated according to network slices or objects with mapping relationship with the network slices.

The determining module is configured to determine the random access resource according to the random access configuration information, and the random access resource is matched with a target network slice to be accessed by a terminal device.

According to one aspect of the present disclosure, an apparatus for determining a random access resource is provided. The apparatus includes a transmitting module.

The transmitting module is configured to transmit random access configuration information, and the random access configuration information is used for indicating that random access resources are allocated according to network slices or objects having a mapping relationship with the network slice.

The random access configuration information is used for a terminal device to determine the random access resource, and the random access resource is matched with a target network slice to be accessed by the terminal device.

According to one aspect of the present disclosure, a terminal device is provided. The terminal device includes a processor, a transceiver connected to the processor, and a memory for storing instructions executable for the processor. The processor is configured to load and execute the executable instructions to implement the method of determining a random access resource as described in the above aspect.

According to one aspect of the present disclosure, a network device is provided. The network device includes a processor, a transceiver connected to the processor, and a memory for storing instructions executable for the processor. The processor is configured to load and execute the executable instructions to implement the method of determining a random access resource as described in the above aspect.

According to one aspect of the present disclosure, a computer-readable storage medium is provided. The readable storage medium stores executable instructions. The executable instructions are loaded and executed by a processor to implement a method of determining a random access resource as described in the above aspects.

According to one aspect of the present disclosure, a computer program product or computer program is provided. The computer program product or computer program includes computer instructions. The computer instructions are stored in a computer-readable storage medium. A processor of the computer device reads the computer instructions from the computer-readable storage medium, and the processor executes the computer instructions, so that the computer device performs the method of determining a random access resource as described in the above aspects.

BRIEF DESCRIPTION OF THE DRAWINGS

In order to more clearly explain the technical solutions in the embodiments of the present disclosure, the appended drawings required to be used in the description of embodiments will be briefly described below. Obviously, the appended drawings described below are only some embodiments of the present disclosure. Other drawings may be obtained according to these appended drawings without creative effort by those of ordinary skill in the art.

FIG. 2 is a schematic diagram of a RAR provided by an exemplary embodiment of the present disclosure.

DETAILED DESCRIPTION

The embodiments of the present disclosure provide a method and an apparatus for determining a random access resource, a communication device and a storage medium. A network device indicates a binding relationship between the random access resources and the network slices by transmitting random access configuration information to a terminal device. Thus, when the terminal device determines the random access resource according to the random access configuration information, the terminal device may select the corresponding random access resource according to the target network slice to be accessed by the terminal device, thereby reducing the probability of collision.

The technical solutions provided by the embodiments of the present disclosure at least include the following beneficial effects.

A network device indicates a binding relationship between the random access resources and the network slices by transmitting random access configuration information to a terminal device. Because network device can flexibly allocate random access resources according to different network slices, such as increasing the scale of random access resource corresponding to critical network slice/popular slice service, or, reducing the scale of the random access resource corresponding to the ordinary network slice/less popular slice service, when the terminal device determines the random access resource according to the random access configuration information, the terminal device may select the corresponding random access resource according to the target network slice to be accessed by the terminal device, thereby reducing the probability of collision.

In order to make the object, technical solutions and advantages of the present disclosure clearer, the embodiments of the present disclosure will be described in further detail below with reference to the accompanying drawings.

First, the nouns involved in the embodiments of the present disclosure are briefly introduced.

Random Access Process

The terminal device needs to perform random access in the situations of transmitting uplink data, receiving downlink data and updating tracking area. The random access includes two types: collision-based random access process and collision-free random access process.

Figure 1:
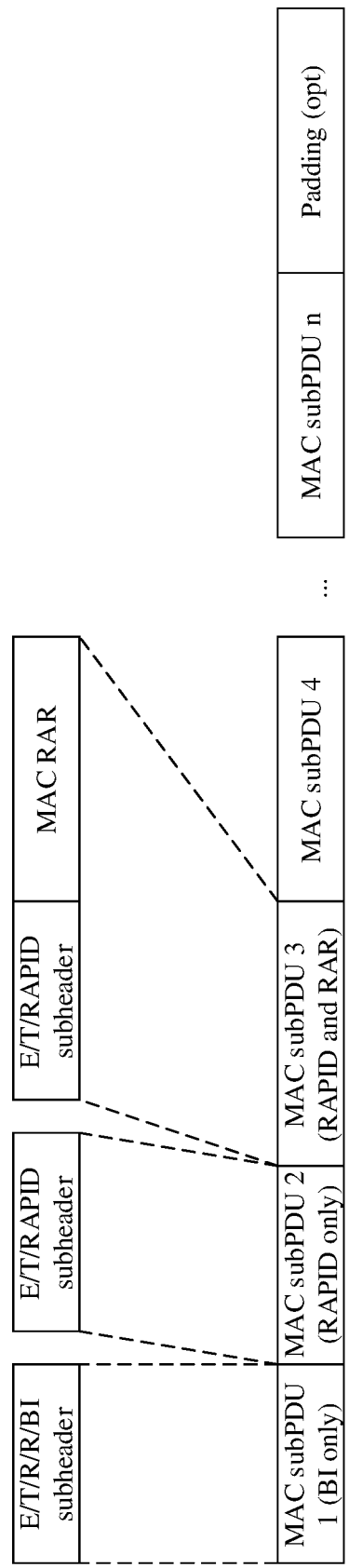
FIG. 1 is a schematic diagram of a MAC PDU provided by an exemplary embodiment of the present disclosure.

In the collision-based random access process, the terminal device transmits msg1 using a common random access preamble (RACH preamble) on a random access time-frequency resource (RACH Occasion, RO). Thereafter, the terminal monitors the Physical Downlink Control Channel (PDCCH) indication information of the network about the Random Access Response (RAR) on the PDCCH using the Random Access Radio Network Temporary Identifier (RA-RNTI). Referring to FIG. 1, a Media Access Control (MAC) Protocol Data Unit (PDU) including a MAC RAR is shown.

When the PDCCH indication information about the RAR is detected, the terminal device decodes the RAR at the time-frequency position given by the PDCCH indication information. If the RAR contains random access preamble information transmitted by the terminal device, the terminal device then transmits the Msg3 using the information corresponding to the random access preamble in the RAR. Referring to FIG. 2, a schematic diagram of a RAR is shown. The RAR includes uplink Grant (UL Grant).

In the msg3, which contains Radio Resource Control (RRC) commands such as RRCSetupRequest, the terminal device needs to carry its own UE ID. In a situation that many terminal devices perform random access, other terminal devices may transmit msg3 (carrying the UE ID of the terminal device) at the time-frequency position indicated by UL Grant to try to access the network too. In this situation, a random access collision will occur among the terminal devices and the network device will only carry the ID of one of the terminal devices in the msg4 to allow it to access the network.

Figure 3:
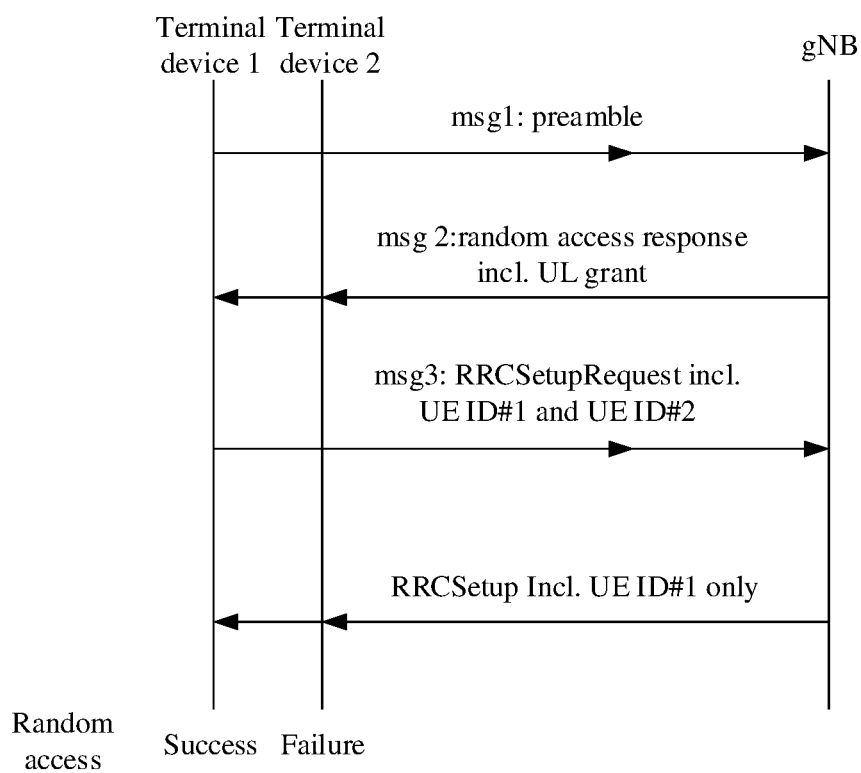
FIG. 3 is a schematic diagram of random access provided by an exemplary embodiment of the present disclosure.

Referring to FIG. 3, a random access collision occurs between the terminal device 1 and the terminal device 2, and the terminal device 1 succeeds in random access, while the terminal device 2 fails in random access.

Network Slice

Network slice is composed of Radio Access Network (RAN) part and Core Network (CN) part. The support of communication network for the network slice depends on that the data communications belonging to different network slices are carried by different protocol data unit sessions (PDU session). In the implementation, the network carries the services of enhanced Mobile Broadband (eMBB) and Ultra-Reliable and Low Latency Communication (URLLC) on different PDU sessions. Different network slices have different Network Slice Selection Assistance Information (NSSAI) and different transmission performance requirements, such as reliability, transmission delay, transmission rate and so on. Each of different PDU sessions may have multiple Quality of Service flows (Qos flow).

Figure 4:
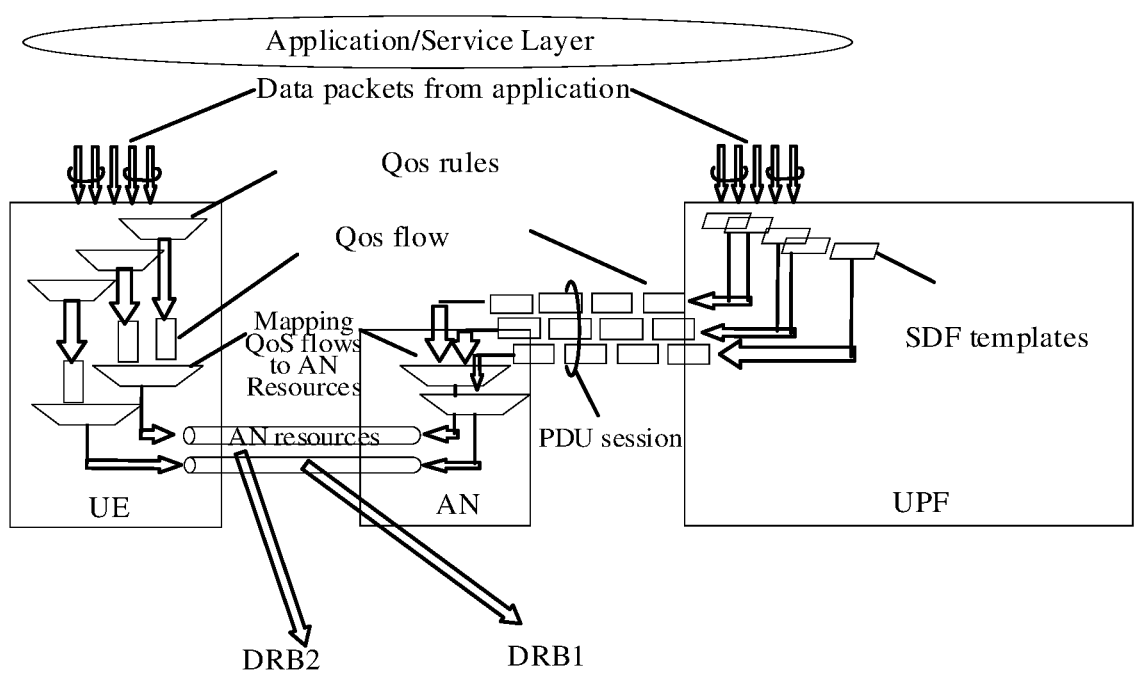
FIG. 4 is a schematic diagram of data transmission provided by an exemplary embodiment of the present disclosure.

Referring to FIG. 4, in the specific communication, in the downlink direction, firstly, the NAS layer Service Data Flow (SDF) template of the core network classifies different data packets from the application layer, maps them to different QoS flows in different PDU sessions, and transmits them to the base station in different PDU sessions. The network device maps them to different Data Radio Bearer (DRB) according to the ID information of the QoS flow and transmits them to the terminal device on the air interface. Similarly, similar operations are implemented for uplink data.

Random Access Resource Partition Based on Synchronization Signal Block (SSB)

In 5G NR, because of the large-scale application of beamforming technology, the terminal device hopes to receive the msg2/msg4 replied by network on a specific beam when performing random access, so as to improve the information reception power.

In Rel-15 NR, the network device allocates different random access resources (such as random access time-frequency resources or random access preambles) for SSBs facing different directions, so that the terminal device selects the random access resource corresponding to the SSB, which correspond to its own expectations, to perform random access. When the network device receives the msg1 from the terminal device, the SSB expected by the terminal device for transmitting downlink information is judged according to the random access preamble and/or the random access time-frequency resource used by the terminal device.

Figure 5:
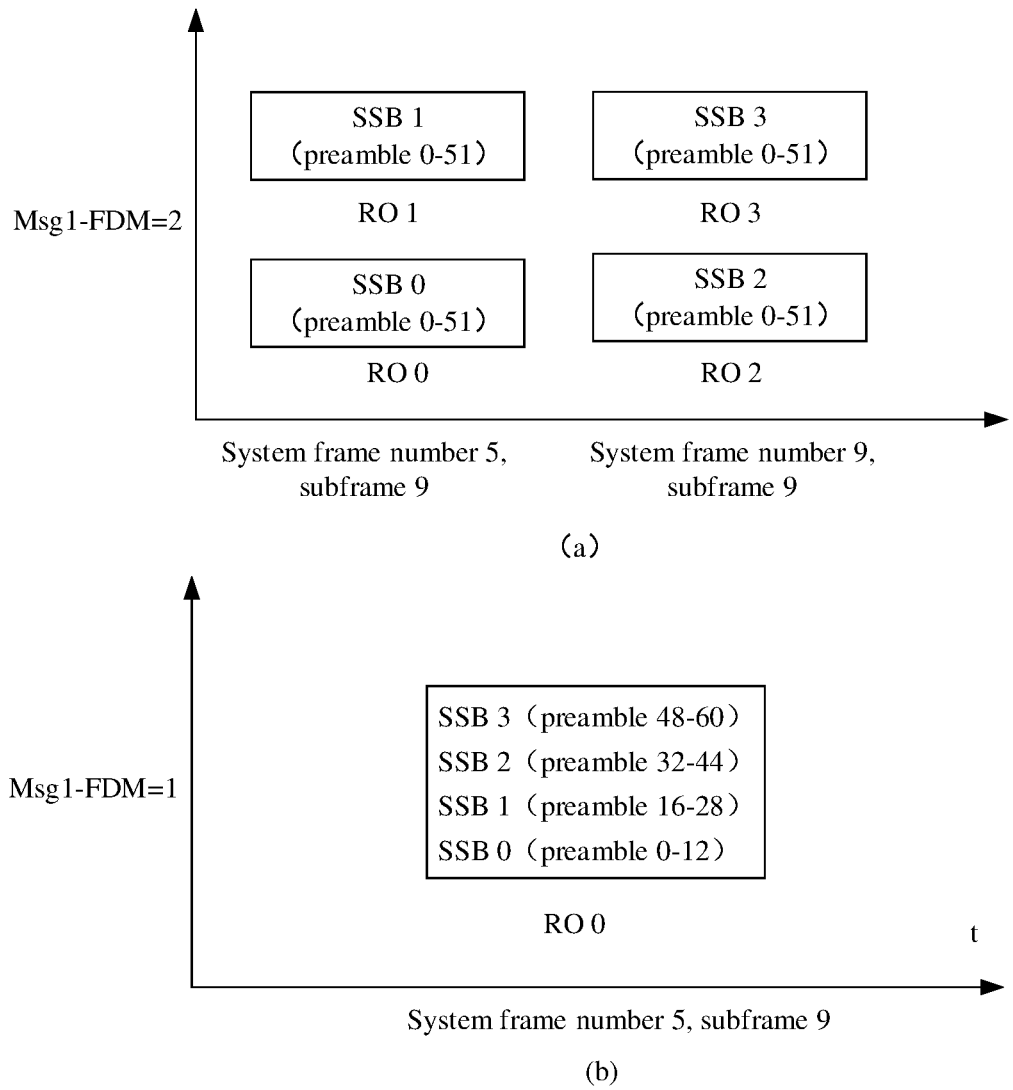
FIG. 5 is a schematic diagram of random access resource partition based on synchronization signal blocks (SSB) provided by an exemplary embodiment of the present disclosure.

Referring to (a) in FIG. 5, ssb-perRACH-OccasionAndCB-PreamblesPerSSB is set to be 1:52, which indicates that one SSB occupies one RO and one SSB corresponds to 52 collision-based preambles (CB-Preambles). The msg1-FDM is set to be 2, which indicates that there are two ROs in different frequency domains at the same time. The RO resources belonging to SSB 0~3 are RO 0~3 respectively.

Referring to (b) in FIG. 5, sssb-perRACH-OccasionAndCB-PreamblesPerSSB is set to be 4:13, which indicates that four SSBs share one RO and one SSB corresponds to 13 collision-based random access preambles. It may be seen that SSB0~4 share each RO, but apply different preamble sets.

Figure 6:
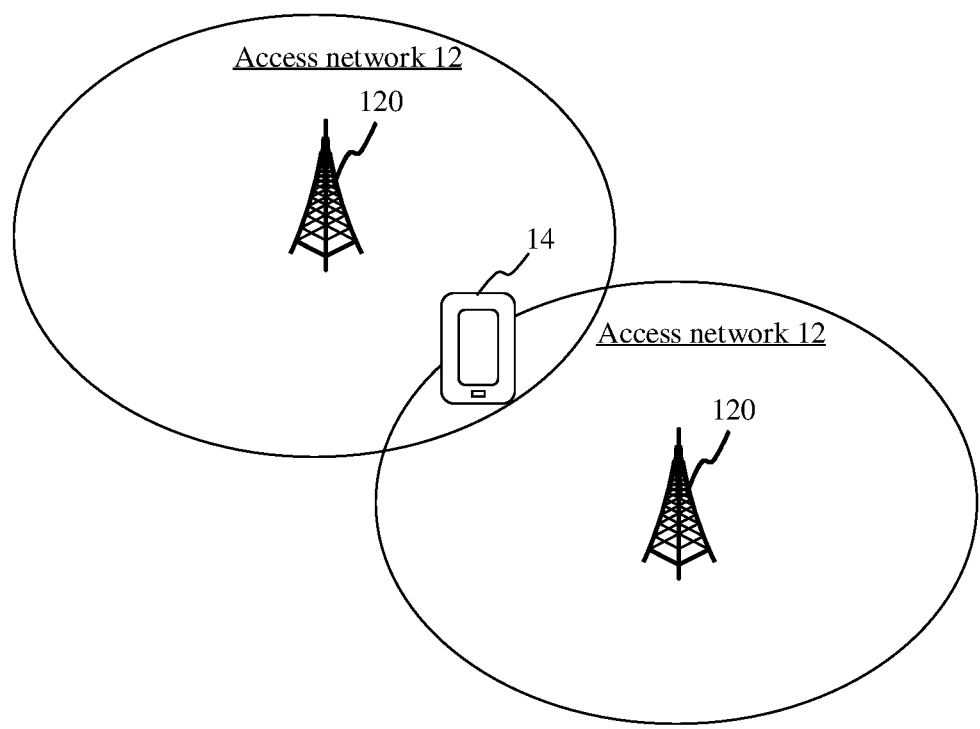
FIG. 6 is a block diagram of a communication system provided by an exemplary embodiment of the present disclosure.

FIG. 6 shows a block diagram of a communication system provided by an exemplary embodiment of the present disclosure. The communication system may include an access network 12 and a terminal device 14.

Several network devices 120 are included in the access network 12. The network device 120 may be a base station. The base station is an apparatus deployed in an access network to provide a wireless communication function for a terminal. Base stations may include various forms of macro base station, micro base station, relay station, access point, and the like. In systems with different wireless access technologies, the names of device with the base station function may be different. For example, in LTE systems, the device with the base station function is called as eNodeB or eNB. In the 5G NR-U system, the device with the base station function is called as gNodeB or gNB. With the evolution of communication technology, the description of "base station" may be changed. For the convenience of description, in the embodiments of the present disclosure, the above apparatus providing the wireless communication function for the terminal device 14 is collectively called as a network device.

The terminal device 14 may include various devices with a wireless communication function, such as a handheld device, a vehicle-mounted device, a wearable device, a computing device, or other processing devices connected to a wireless modem, as well as various forms of user device, a Mobile Station (MS), a terminal device, and the like. For convenience of description, the devices mentioned above are collectively called as terminals. The network device 120 and the terminal device 14 communicate with each other through a kind of air interface technology, such as a Uu interface.

The technical solutions of the embodiments of the present disclosure may be applied to various communication systems, for example, Global System of Mobile Communication (GSM) system, Code Division Multiple Access (CDMA) system, Wideband Code Division Multiple Access (WCDMA) system, General Packet Radio Service (GPRS), Long Term Evolution (LTE) system, LTE Frequency Division Duplex (FDD) system, LTE Time Division Duplex (TDD) system, Advanced Long Term Evolution (LTE-A) system, New Radio (NR) system, evolution system of NR system, LTE-based access to Unlicensed Spectrum (LTE-U), NR-U system, Universal Mobile Telecommunications System (UMTS), Worldwide Interoperability for Microwave Access (WiMAX) communication system, Wireless Local Area Network (WLAN), Wireless Fidelity (WiFi), next generation communication system or other communication systems.

Generally speaking, traditional communication systems support a limited number of connections and are easy to be implemented. However, with the development of communication technology, mobile communication systems will not only support traditional communication, but also support, for example, Device to Device (D2D) communication, Machine to Machine (M2M) communication, Machine Type Communication (MTC), Vehicle to Vehicle (V2V) communication and Vehicle to Everything (V2X) systems. Embodiments of the present disclosure may also be applied to these communication systems.

Figure 7:
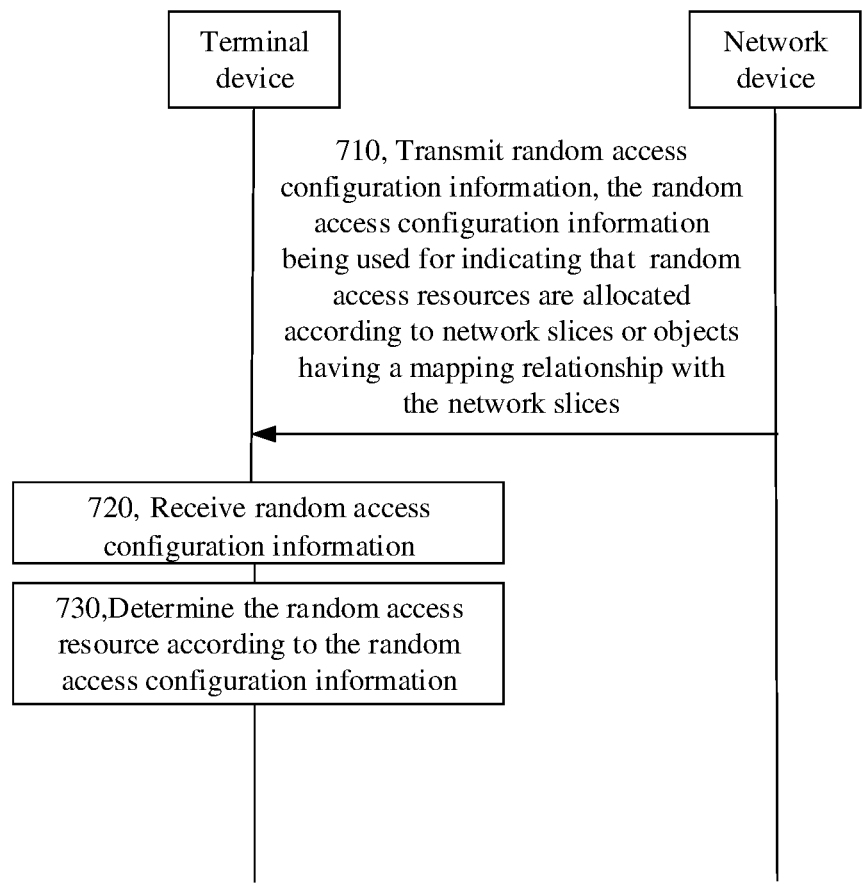
FIG. 7 is a flowchart of a method for determining of a random access resource provided by an exemplary embodiment of the present disclosure.

FIG. 7 illustrates a flowchart of a method of determining a random access resource provided by an exemplary embodiment of the present disclosure. The method may be applied to a terminal device and a network device as shown in FIG. 6, and the method includes the following operations.

In operation 710, a network device transmits random access configuration information to a terminal device, and the random access configuration information is used for indicating that the random access resources are allocated according to the network slices or the objects having a mapping relationship with the network slices.

The random access configuration information is the information configured by the network device for random access. The random access information includes the allocation result obtained by allocating the random access resources according to the network slices or the objects having the mapping relationship with the network slices.

The random access resource includes, but is not limited to, at least one of a random access time-frequency resource and a random access preamble.

In one implementation, random access configuration information may be used for indicating that random access time-frequency resources are allocated according to network slices or objects having a mapping relationship with network slices. In another implementation, the random access configuration information may be used for indicating that the random access preambles are allocated according to network slices or objects having a mapping relationship with the network slices.

The network slice is a slice network based on PDU session, which needs to be jointly processed by RAN side and CN side. Each network slice is logically isolated from the radio access network bearer network to the core network, so as to meet the requirements of different types of applications.

There is a one-to-one relationship, or a many-to-one relationship, among network slices and objects having a mapping relationship with the network slices. That is, multiple network slices correspond to one object having a mapping relationship with the network slices, or one network slice corresponds to one object having a mapping relationship with the network slice. The object having a mapping relationship with the network slice supports querying one or more corresponding network slices through the object.

Alternatively, identifiers corresponding to the objects having the mapping relationship with the network slices are data obtained after performing an operation on identifiers of the network slices, and the specific operation manner is not limited in the embodiments of the present disclosure.

Alternatively, the identifier of the network slice refers to Single-Network Slice Selection Assistance Information (S-NSSAI) corresponding to the network slice. Each network slice is identified by a unique S-NSSAI. S-NSSAI consists of Slice/Service type (SST) and Slice Differentiator (SD). SST represents service type, and SD represents different terminal groups of services under the same service type.

That is to say, the identifier of the network slice or the identifier of the object having mapping relationship with the network slice may be used for identifying the network slice. After the network device allocates the random access resources according to the network slices, the binding relationship between the random access resource and the network slice is informed to the terminal device through the random access configuration information. Alternatively, when the network device allocates random access resources, more random access resources are allocated for network slices with more services or higher service performance requirements, and less random access resources are allocated for network slices with less services or lower service performance requirements.

Alternatively, the random access configuration information may indicate that the random access resources are allocated according to non-data-transmission services in addition to indicating that the random access resources are allocated according to the network slices or objects having a mapping relationship with the network slices.

The non-data-transmission service is a service unrelated to data transmission. The non-data-transmission service includes, but is not limited to tracking area update, uplink time advance acquisition and radio access network (RAN) notification area update.

In operation 720, the terminal device receives the random access configuration information.

In operation 730, the terminal device determines the random access resource according to the random access configuration information.

The random access resource is matched with the target network slice to be accessed by the terminal device.

Since the allocation result after allocating the random access time-frequency resources according to the network slices or the objects having mapping relationship with the network slices is configured in the random access configuration information, the terminal device may select the random access resource corresponding to the target network slice according to the configuration of the network device when the terminal device wants to access the target network slice Alternatively, when there are multiple random access resources corresponding to the target network slice, the terminal device randomly selects one of the random access resources, or selects one random access resource according to certain rules.

To sum up, in the method provided by the embodiment, a network device indicates a binding relationship between the random access resources and the network slices by transmitting random access configuration information to a terminal device. Because the network device can flexibly allocate random access resources according to different network slices, such as increasing the scale of random access resource corresponding to critical network slice/popular slice service, or, reducing the scale of the random access resource corresponding to the ordinary network slice/less popular slice service, when the terminal device determines the random access resource according to the random access configuration information, the terminal device may select the corresponding random access resource according to the target network slice to be accessed by the terminal device, thereby reducing the probability of collision.

Meanwhile, in the method provided by the embodiment, because of the binding relationship between random access resources and network slices, the network device may know the target network slice that terminal device wants to access through random access resource during random access process, so as to decide whether to refuse random access of terminal device according to current network load situation, and improve communication efficiency.

In an optional embodiment based on FIG. 7, the network device allocates random access resources according to network slices or objects having a mapping relationship with network slices, which may include the following two implementations.

In the first implementation, the network device allocates the random access preambles according to the network slices or the objects with mapping relationship with the network slices.

That is, the network device performs slice partition on the preamble domain, and there is a binding relationship between the random access preambles and the network slices.

Correspondingly, at this time, the random access configuration information transmitted by the network device includes a first allocation result. The first allocation result is an allocation result obtained by allocating the random access preambles according to the network slices or the objects having a mapping relationship with the network slices.

In the second implementation, the network device allocates random access time-frequency resources according to network slices or objects with mapping relationship with network slices.

That is, the network device performs slice partition on the random access time-frequency domain, and there is a binding relationship between ROs and network slices.

Correspondingly, the random access configuration information transmitted by the network device includes a second allocation result. The second allocation result is an allocation result obtained by allocating the random access time-frequency resources according to the network slices or the objects having a mapping relationship with the network slices.

Hereinafter, an exemplary description will be given of the above two implementations.

Implementation Manner 1

The random access configuration information includes the first allocation result. The first allocation result is an allocation result obtained by allocating random access preambles according to network slices or objects having a mapping relationship with the network slices.

In the embodiments of the present disclosure, a random access preamble may uniquely correspond to a network slice, or one of the random access preambles may correspond to two or more network slices.

When the network slice to be accessed by the terminal device is the network slice a, the terminal device may select a target random access preamble from the random access preambles matched with the network slice a according to the first allocation result, and perform random access.

Alternatively, the first allocation result includes at least one of the followingthree results.

1. A ratio of number(s) of random access preambles allocated for at least one of the network slices or object(s) having a mapping relationship with the at least one of the network slices may be included.

Exemplarily, there are network slice a and network slice b. The ratio of the numbers of random access preambles allocated for network slice a and network slice b is 3:2.

2. The number(s) of random access preambles allocated for at least one of the network slices or the object(s) having a mapping relationship with the at least one of the network slices may be included.

Exemplarily, there are network slice a and network slice b. The numbers of random access preambles allocated for network slice a and network slice b are 12 and 40, respectively.

3. A bitmap for indicating whether to allocate random access preambles for the at least one of the network slices or object(s) having the mapping relationship with the at least one of the network slices may be included.

Exemplarily, there are network slice a and network slice b. The bitmap of the random access preambles allocated for the network slice a and the network slice b is "11". That is, the random access preambles are allocated for both the network slice a and the network slice b. The bitmap of the random access preambles allocated for the network slice a and the network slice b is "10". That is, the random access preamble is allocated for the network slice a, and the random access preamble is not allocated for the network slice b. The bitmap of the random access preambles allocated for the network slice a and the network slice b is "00". That is, the random access preamble is not allocated for the network slice a and the network slice b.

In one implementation, the first allocation result includes the above first result. In another implementation, the first allocation result includes the above second result. In another implementation, the first allocation result includes the above first result and the above third result. In another implementation, the first allocation result includes the above second result and the above third result.

Alternatively, the random access preambles are allocated according to an ascending order of identifiers of the network slices or an ascending order of identifiers of the objects having the mapping relationship with the network slices. Alternatively, the random access time-frequency resources are allocated according to a descending order of the identifiers of the network slices or a descending order of the identifiers of the objects having the mapping relationship with the network slices.

That is, the network device may first allocate the random access preambles for the network slices with less identifier values or the objects having a mapping relationship with the network slices with less identifier values (i.e., allocating according to the ascending order), or may first allocate the random access preambles for the network slices with greater identifier values or the objects with a mapping relationship with the network slices with greater identifier values (i.e., allocating according to the descending order).

Figure 8:
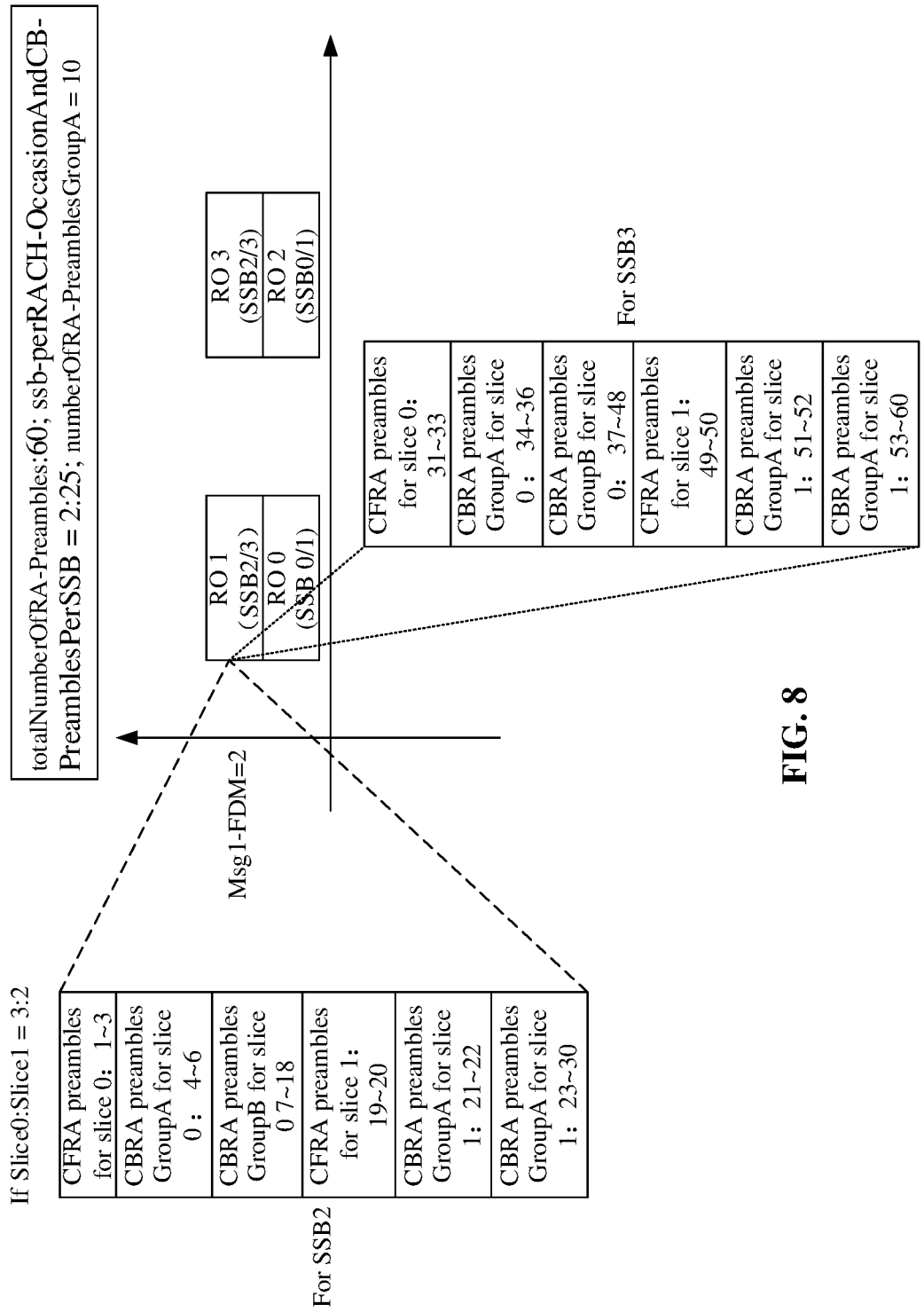
FIG. 8 is a schematic diagram of performing slice partition on a preamble domain provided by an exemplary embodiment of the present disclosure.

Exemplarily, referring to FIG. 8, a schematic diagram of performing slice partition on a preamble domain is shown.

The msg1-FDM is set to be 2, which indicates that there are two ROs in different frequency domains at the same time. The totalNumberOfra-Preambles is 60, which indicates that the total number of preambles that may be used in the random access process of the cell is 60. The ssb-perRACH-OccasionAndCB-PreamblesPerSSB is 2:25, which indicates that two SSBs share one RO and one SSB corresponds to 25 collision-based random access preambles. The numberOfra-PreamblesGroupA is 10, which indicates that the number of random access preambles belonging to GroupA is 10.

The network device performs slice partition on the preamble domain. The first allocation result may include: slice 0: slice 1=3:2. The first allocation result may also include that the number of random access preambles allocated for slice 0 is 36, and the number of random access preambles allocated for slice 1 is 24. The first allocation result may also include: slice 0: slice 1=3:2 and bitmap='011' (slice 2 is set to be 0). The first allocation result may also include: the number of random access preambles allocated for slice 0 is 36, the number of random access preambles allocated for slice 1 is 24, and bitmap='011'.

As shown in FIG. 8, RO 1 corresponds to SSB1 and SSB2, the number of random access preambles allocated for slice 0 is 36, and the number of random access preambles allocated for slice 1 is 24.

Figure 9:
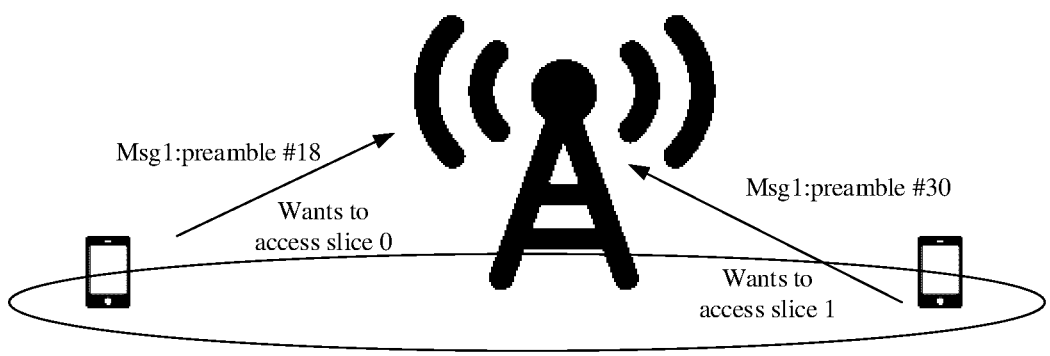
FIG. 9 is a schematic diagram of determining a random access preamble provided by an exemplary embodiment of the present disclosure.

Referring to FIG. 9, if the target network slice that the terminal device wants to access is slice 0, the terminal device may select a random access preamble 18 to try to access the network. If the target network slice that the terminal device wants to access is slice 1, the terminal device may select a random access preamble 30 to try to access the network.

Implementation Manner 2

The random access configuration information includes the second allocation result. The second allocation result is an allocation result obtained by allocating random access time-frequency resources according to the network slices or objects having a mapping relationship with the network slices.

In the embodiments of the present disclosure, a random access time-frequency resource may uniquely correspond to a network slice, or one of the random access time-frequency resources may correspond to two or more network slices.

When the network slice to be accessed by the terminal device is the network slice a, the terminal device may select a random access time-frequency resource from the random access time-frequency resources matched with the network slice a according to the second allocation result and perform random access.

Alternatively, the second allocation result includes at least one of the following three results.

1. A ratio of number(s) of random access time-frequency resources allocated for at least one of the network slices or object(s) having a mapping relationship with the at least one of the network slices may be included.

Exemplarily, there are network slice a and network slice b. The ratio of the numbers of random access time-frequency resources allocated for network slice a and network slice b is 3:1.

2. The number(s) of random access time-frequency resources allocated for at least one of the network slices or the object(s) having a mapping relationship with the at least one of the network slices may be included.

Exemplarily, there are network slice a and network slice b. The numbers of random access time-frequency resources allocated for network slice a and network slice b are 3 and 1, respectively.

3. A bitmap for indicating whether to allocate random access time-frequency resources for at least one of the network slices or the object(s) having a mapping relationship with the at least one of the network slices may be included.

Exemplarily, there are network slice a, network slice b and network slice c. The bitmap of random access time-frequency resources allocated for network slice a, network slice b and network slice c is "011". That is, the random access time-frequency resources are allocated for network slice a and network slice b, and random access time-frequency resource is not allocated for network slice c.

In one implementation, the second allocation result includes the above first result. In another implementation, the second allocation result includes the above second result. In another implementation, the second allocation result includes the above first result and the above third result. In another implementation, the second allocation result includes the above second result and the above third result.

Alternatively, the random access time-frequency resources are allocated according to an ascending order of the identifiers of the network slices or an ascending order of the identifiers of objects having a mapping relationship with the network slices. Alternatively, the random access time-frequency resources are allocated according to a descending order of the identifiers of the network slices or a descending order of the identifiers of objects having a mapping relationship with the network slices.

That is, the network device may first allocate the random access time-frequency resources for the network slices with less identifier values or the objects having a mapping relationship with the network slices with less identifier values (i.e., allocating according to the ascending order), or may first allocate the random access time-frequency resources for the network slices with greater identifier values or the objects having a mapping relationship with network slices with greater identifier values (i.e., allocating according to the descending order).

Figure 10:
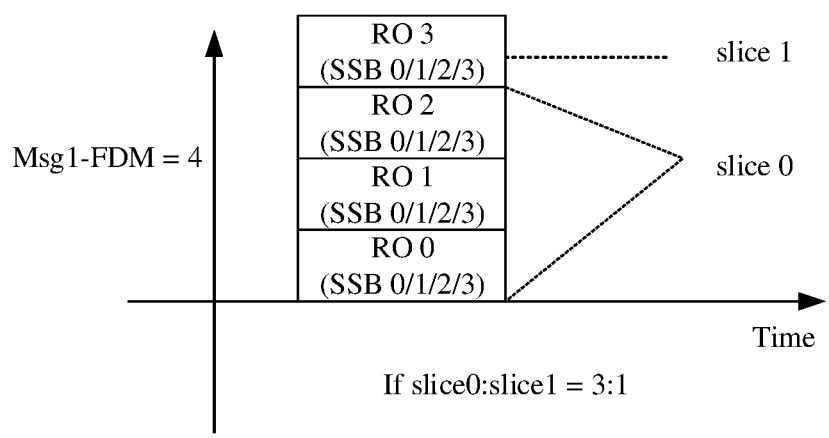
FIG. 10 is a schematic diagram of performing slice partition on a random access time-frequency domain provided by an exemplary embodiment of the present disclosure.

Exemplarily, referring to FIG. 10, a schematic diagram of performing slice partition on a random access time-frequency domain is shown.

The msg1-FDM is set to be 4, which indicates that there are four ROs in different frequency domains at the same time. The totalNumberOfra-Preambles is 60, which indicates that the total number of preambles that may be used in the random access process of the cell is 60. The ssb-perRACH-OccasionAndCB-PreamblesPerSSB is 4:15, which indicates that four SSBs share one RO and one SSB corresponds to 15 collision-based random access preambles.

The network device performs slice partition on the preamble domain. The second allocation result may include: slice 0: slice 1=3:1. The second allocation result may also include that the number of ROs allocated for slice 0 is 3, and the number of ROs allocated for slice 1 is 1. The second allocation result can also include slice 0: slice 1=3:1 and bitmap='011' (slice 2 is set to be 0). The second allocation result may also include that the number of ROs allocated for slice 0 is 3, the number of ROs allocated for slice 1 is 1, and bitmap='011'.

As shown in FIG. 10, RO 0, RO 1, and RO 2 are allocated for slice 0, and RO 3 is allocated for slice 1.

Figure 11:
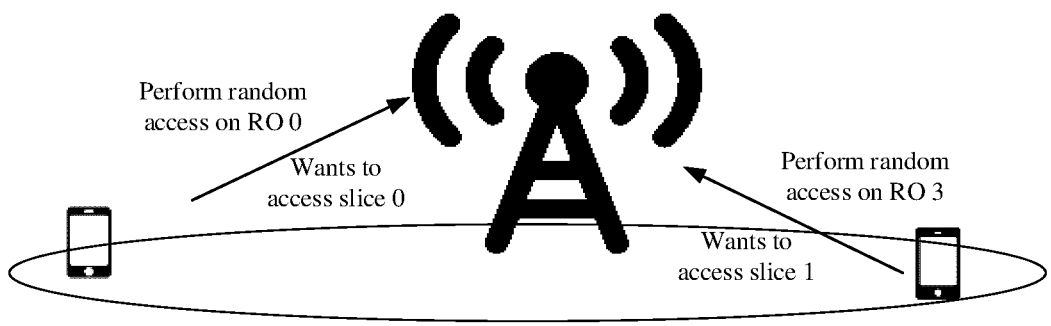
FIG. 11 is a schematic diagram of determining a random access time-frequency resource provided by an exemplary embodiment of the present disclosure.

Referring to FIG. 11, if the target network slice that the terminal device wants to access is slice 0, the terminal device may select RO 0 to try to access the network. If the target network slice that the terminal device wants to access is slice 1, the terminal device may select RO 3 to try to access the network.

To sum up, the random access configuration information transmitted by the network device may include the first allocation result. That is, the random access preambles are allocated according to the network slices or the objects having mapping relation with the network slices. The random access configuration information transmitted by the network device may further include the second allocation result. That is, the random access time-frequency resources are allocated according to the network slices or the objects having mapping relation with the network slices. Thus, the flexibility of the method for determining the random access resource is improved.

Figure 12:
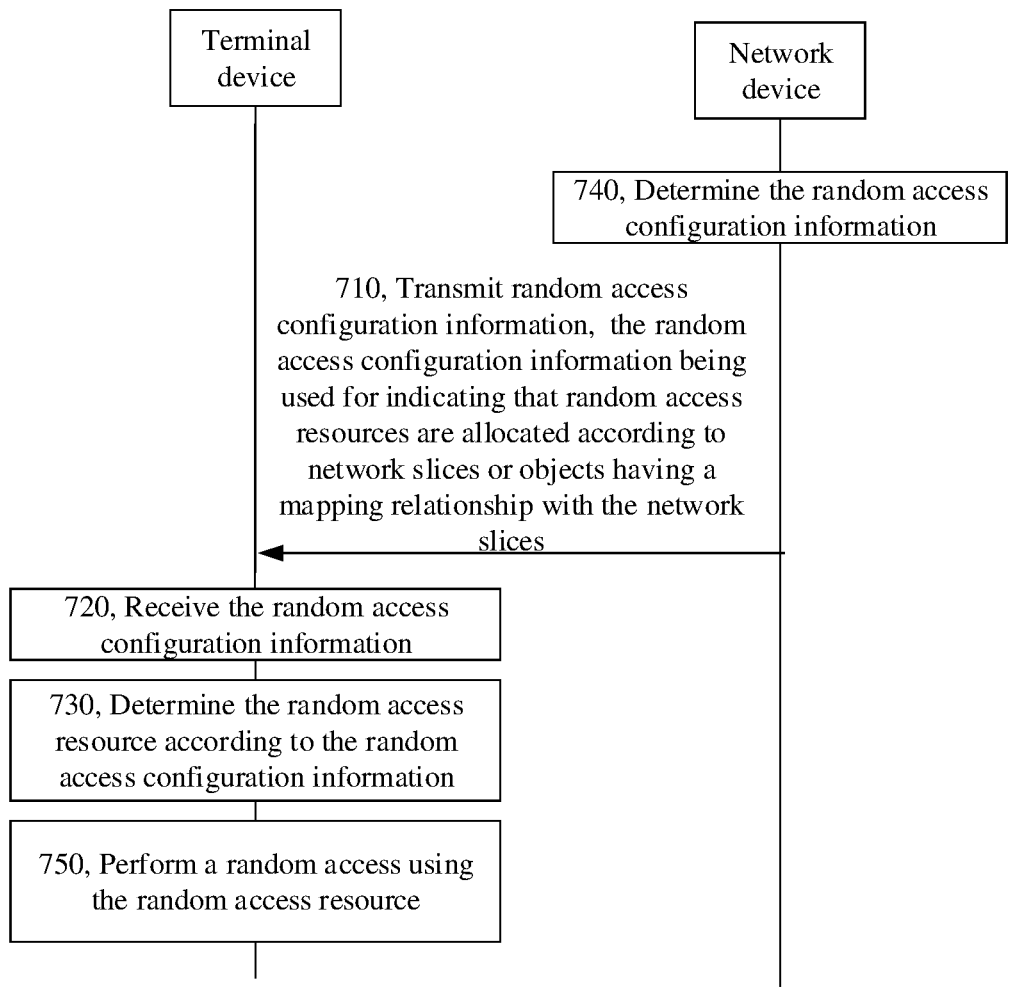
FIG. 12 is a flowchart of a method for determining a random access resource provided by an exemplary embodiment of the present disclosure.

In an alternative embodiment based on FIG. 7, FIG. 12 illustrates a flowchart of a method of determining a random access resource provided by an exemplary embodiment of the present disclosure. In this embodiment, operations 740 and 750 are further included.

In operation 740, the network device determines the random access configuration information.

The random access configuration information is determined by the network device according to at least one of the following: the network load condition, the network capability and the terminal history access information.

In operation 710, the network device transmits random access configuration information to the terminal device. The random access configuration information is used for indicating that the random access resources are allocated according to the network slices or the objects having a mapping relationship with the network slices.

Alternatively, the random access configuration information is carried in the system message. Alternatively, the random access configuration information is carried in RRC signaling. The network device may also transmit random access configuration information through other signaling, which is not limited by the embodiments of the present disclosure.

Alternatively, random access resources may be allocated according to non-data-transmission services. The non-data-transmission service includes at least one of the following: tracking area update, uplink time advance acquisition, and radio access network notification area update.

In one implementation, the network slice includes default network slice. The default network slice is used for carrying service for the basic transmission performance requirement and/or is associated with non-data-transmission service. For example, the default network slice is only associated with non-data-transmission service, or the default network slice is only used for carrying eMBB service (that is, service for the basic transmission performance requirement), or the default network slice is used for carrying eMBB service and is associated with non-data-transmission service. That is, since the default network slice may be used for carrying non-data-transmission service, the random access resources may be allocated according to the non-data-transmission service.

In another implementation, the random access configuration information is further used for indicating a correspondence between a random access resource and random access performed due to non-data-transmission service. That is, the non-data-transmission service is not carried by the network slice (such as the default network slice), and the random access configuration information additionally indicates the correspondence between the random access resource and the random access performed due to the non-data-transmission service.

In operation 720, the terminal device receives the random access configuration information.

In operation 730, the terminal device determines the random access resource according to the random access configuration information.

In operation 750, the terminal device performs random access using random access resource.

Alternatively, the random access resource includes at least one of the following: random access preamble(s) and random access time-frequency resource(s). The terminal device transmits the random access preamble to the network device through the random access time-frequency resource.

To sum up, in the method provided by the embodiment, the random access resource corresponding to the non-data-transmission service may be indicated through the random access configuration information, so that the terminal device may determine the corresponding random access resource when performing the non-data transmission service.

It should be noted that the above method embodiments may be implemented separately or in combination, which is not limited in the present disclosure.

In above various embodiments, the operations performed by the terminal device may be separately implemented as a method for processing handover failure on the terminal device side, and the operations performed by the network device may be separately implemented as a method for determining random access resource on the network device side.

Figure 13:
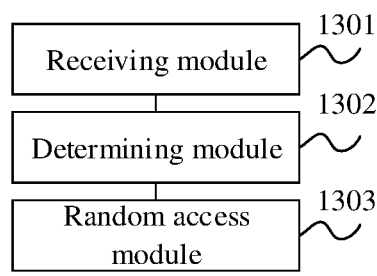
FIG. 13 is a block diagram of structure of an apparatus for determining a random access resource provided by an exemplary embodiment of the present disclosure.

FIG. 13 illustrates a block diagram of structure of an apparatus for determining a random access resource provided by an exemplary embodiment of the present disclosure. The apparatus may be implemented as a terminal device or as a part of the terminal device. The apparatus includes a receiving module 1301 and a determining module 1302.

The receiving module 1301 is configured to receive random access configuration information. The random access configuration information is used for indicating that random access resources are allocated according to network slices or objects having a mapping relationship with network slices.

The determining module 1302 is configured to determine the random access resource according to the random access configuration information, and the random access resource is matched with the target network slice to be accessed by the terminal device.

In an alternative embodiment, the random access configuration information includes a first allocation result. The first allocation result is an allocation result obtained by allocating random access preambles according to the network slices or the objects having the mapping relationship with the network slices.

In an alternative embodiment, the first allocation result includes at least one of the following: a ratio of number(s) of random access preambles allocated for at least one of the network slices or object(s) having a mapping relationship with the at least one of the network slices; the number(s) of random access preambles allocated for the at least one of network slices or object(s) having a mapping relationship with the at least one of the network slices; and a bitmap for indicating whether to allocate random access preambles for the at least one of the network slices or the object(s) having a mapping relationship with the at least one of the network slices.

In an alternative embodiment, the random access preambles are allocated according to an ascending order of identifiers of the network slices or an ascending order of identifiers of the objects having the mapping relationship with the network slices. Alternatively, the random access preambles are allocated according to a descending order of the identifiers of the network slices or a descending order of the identifiers of the objects having the mapping relationship with the network slices.

In an alternative embodiment, the random access configuration information includes a second allocation result. The second allocation result is an allocation result obtained by allocating random access time-frequency resources according to the network slices or the objects having the mapping relationship with the network slices.

In an alternative embodiment, the second allocation result includes at least one of the following: a ratio of number(s) of random access time-frequency resources allocated for at least one of the network slices or object(s) having a mapping relationship with the at least one of the network slices; the number(s) of random access time-frequency resources allocated for the at least one of the network slices or object(s) having a mapping relationship with the at least one of the network slices; and a bitmap for indicating whether to allocate random access time-frequency resources for the at least one of the network slices or the object(s) having the mapping relationship with the at least one of the network slices.

In an alternative embodiment, the random access time-frequency resources are allocated according to an ascending order of identifiers of the network slices or an ascending order of identifiers of the objects having the mapping relationship with the network slices. Alternatively, the random access time-frequency resources are allocated according to a descending order of the identifiers of the network slices or a descending order of the identifiers of the objects having the mapping relationship with the network slices.

In an alternative embodiment, identifiers corresponding to the objects having a mapping relationship with the network slices are data obtained after performing an operation on identifiers of the network slices.

In an alternative embodiment, there is a many-to-one relationship among the network slices and the objects having the mapping relationship with the network slices, or there is a one-to-one relationship among the network slices and objects having the mapping relationship with the network slices.

In an alternative embodiment, the network slices include default network slices. Alternatively, the random access configuration information is further used for indicating a correspondence between a random access resource and a random access performed due to a non-data transmission service. In an alternative embodiment, the non-data-transmission service includes at least one of following: a tracking area update, an uplink time advance acquisition, and a radio access network notification area update.

In an alternative embodiment, the random access configuration information is carried in a system message. Alternatively, the random access configuration information is carried in radio resource control (RRC) signaling.

In an alternative embodiment, the apparatus further includes a random access module 1303. The random access module 1303 is used for performing a random access using the target random access resource.

Figure 14:
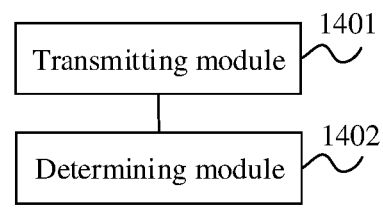
FIG. 14 is a block diagram of structure of an apparatus for determining a random access resource provided by an exemplary embodiment of the present disclosure.

FIG. 14 illustrates a block diagram of structure of an apparatus for determining a random access resource provided by an exemplary embodiment of the present disclosure. The apparatus may be implemented as a network device, or as a part of the network device. The apparatus includes a transmitting module 1401.

The transmitting module 1401 is configured to transmit random access configuration information. The random access configuration information is used for indicating that random access resources are allocated according to network slices or objects having mapping relationship with network slices.

The random access configuration information is used for a terminal device to determine the random access resource, and the random access resource is matched with a target network slice to be accessed by the terminal device.

In an alternative embodiment, the random access configuration information includes a first allocation result. The first allocation result is an allocation result obtained by allocating random access preambles according to the network slices or the objects having a mapping relationship with the network slice.

In an alternative embodiment, the first allocation result includes at least one of the following: a ratio of number(s) of random access preambles allocated for at least one of the network slices or object(s) having a mapping relationship with the at least one of the network slices; the number(s) of random access preambles allocated for the at least one of the network slices or the object(s) having the mapping relationship with the at least one of the network slices; and a bitmap for indicating whether to allocate random access preambles for the at least one of the network slices or the object(s) having the mapping relationship with the at least one of the network slices.

In an alternative embodiment, the random access preambles are allocated according to an ascending order of identifiers of network slices or an ascending order of identifiers of objects having a mapping relationship with the network slices. Alternatively, the random access preambles are allocated according to a descending order of the identifiers of the network slices or a descending order of the identifiers of objects having the mapping relationship with the network slices.

In an alternative embodiment, the random access configuration information includes a second allocation result. The second allocation result is an allocation result obtained by allocating random access time-frequency resources according to the network slices or the objects having the mapping relationship with the network slices.

In an alternative embodiment, the second allocation result includes at least one of the following: a ratio of number(s) of random access time-frequency resources allocated for at least one of the network slices or object(s) having a mapping relationship with the at least one of the network slices; the number(s) of random access time-frequency resources allocated for the at least one of the network slices or the object(s) having the mapping relationship with the at least one of the network slices; and a bitmap for indicating whether to allocate random access time-frequency resources for the at least one of the network slices or the object(s) having the mapping relationship with the at least one of the network slices.

In an alternative embodiment, the random access time-frequency resources are allocated according to an ascending order of identifiers of network slices or an ascending order of identifiers of objects having a mapping relationship with the network slices. Alternatively, the random access time-frequency resources are allocated according to a descending order of the identifiers of the network slices or a descending order of the identifiers of objects having the mapping relationship with the network slices.

In an alternative embodiment, identifiers corresponding to the objects having the mapping relationship with the network slices are data obtained after performing an operation on identifiers of the network slices.

In an alternative embodiment, there is a many-to-one relationship among the network slices and the objects having the mapping relationship with the network slices, or there is a one-to-one relationship among the network slices and the objects having the mapping relationship with the network slices.

In an alternative embodiment, the network slices include default network slices. Alternatively, the random access configuration information is further used for indicating a correspondence between a random access resource and a random access performed due to a non-data transmission service.

In an alternative embodiment, the non-data-transmission service includes at least one of following: a tracking area update, an uplink time advance acquisition, and a radio access network notification area update. In an alternative embodiment, the random access configuration information is carried in the system message. Alternatively, the random access configuration information is carried in radio resource control (RRC) signaling.

In an alternative embodiment, the apparatus further includes a determining module 1402. The determining module 1402 is configured to determine the random access configuration information. The random access configuration information is determined according to at least one of a network load condition, a network capability, and terminal history access information.

Figure 15:
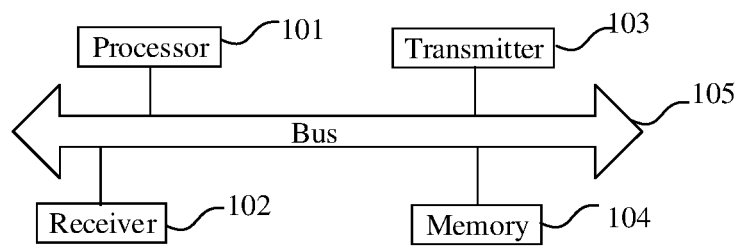
FIG. 15 is a schematic structural diagram of a communication device provided by an exemplary embodiment of the present disclosure.

FIG. 15 illustrates a schematic diagram of the structure of a communication device (terminal device or network device) provided by an exemplary embodiment of the present disclosure. The communication device includes a processor 101, a receiver 102, a transmitter 103, a memory 104, and a bus 105.

The processor 101 includes one or more processing cores and executes various functional applications and information processing by running software programs and modules.

The receiver 102 and the transmitter 103 may be implemented as a communication component which may be a communication chip.

The memory 104 is connected to the processor 101 through a bus 105.

The memory 104 may be configured to store at least one instruction and the processor 101 may be configured to execute the at least one instruction to implement the various operations in the above method embodiments.

Additionally, the memory 104 may be implemented by any type of volatile or non-volatile storage device or a combination thereof. The volatile or non-volatile storage device includes, but is not limited to, magnetic disk or optical disk, Electrically-Erasable Programmable Read Only Memory (EEPROM), Erasable Programmable Read Only Memory (EPROM), Static Random Access Memory (SRAM), Read-Only Memory (ROM), magnetic memory, flash memory, and Programmable Read-Only Memory (PROM).

In an exemplary embodiment, a computer readable storage medium is further provided. At least one instruction, at least one program, a code set or an instruction set is stored in the computer readable storage medium. The at least one instruction, the at least one program, the code set or the instruction set is loaded and executed by a processor to implement the method of determining a random access resource performed by a communication device provided by the various method embodiments described above.

In an exemplary embodiment, a computer program product or a computer program is further provided. The computer program product or computer program includes computer instructions. The computer instructions are stored in a computer-readable storage medium. A processor of the computer device reads the computer instructions from the computer-readable storage medium. The processor executes the computer instructions so that the computer device performs the method of determining a random access resource as described in the above aspects.

Those of ordinary skill in the art should understand that all or part of the operations to implement the above embodiments may be completed by hardware or may be instructed by a program stored to be completed. The program may be stored in a computer-readable storage medium. The storage medium may be a Read-Only Memory, a magnetic disk or an optical disk, etc.

The above description is only alternative embodiments of the present disclosure, and is not intended to limit the present disclosure. Any modification, equivalent replacement, improvement, etc. made within the spirit and principles of the present disclosure shall be included in the scope of protection of the present disclosure.

The invention claimed is:

1. A method for determining a random access resource, applicable for a terminal device and comprising:
receiving random access configuration information, wherein the random access configuration information is used for indicating that random access resources are allocated according to network slices; and
determining the random access resource according to the random access configuration information, wherein the random access resource is matched with a target network slice to be accessed by the terminal device,
wherein the random access resources comprise random access preambles and random access time-frequency resources, and the random access configuration information comprises a bitmap for indicating whether to allocate random access preambles for at least one of the network slices and a bitmap for indicating whether to allocate random access time-frequency resources for the at least one of the network slices.

2. The method of claim 1, wherein,
the random access configuration information is carried in a system message; or
the random access configuration information is carried in radio resource control (RRC) signaling.

3. The method of claim 1, wherein,
the random access preambles are allocated according to an ascending order of identifiers of the network slices; or
the random access preambles are allocated according to a descending order of the identifiers of the network slices.

4. The method of claim 1, wherein,
the random access time-frequency resources are allocated according to an ascending order of identifiers of the network slices; or
the random access time-frequency resources are allocated according to a descending order of the identifiers of the network slices.

5. The method of claim 1, wherein,
the network slices comprise default network slices; or
the random access configuration information is further used for indicating a correspondence between a random access resource and a random access performed due to a non-data-transmission service.

6. The method of claim 5, wherein the non-data-transmission service comprises at least one of following:
tracking area update, uplink time advance acquisition, or radio access network notification area update.

7. The method of claim 1, further comprising:
performing a random access using the random access resource.

8. A method for determining a random access resource, applicable for a network device and comprising:
transmitting random access configuration information, wherein the random access configuration information is used for indicating that random access resources are allocated according to network slices;
wherein the random access configuration information is used for a terminal device to determine the random access resource, and the random access resource is matched with a target network slice to be accessed by the terminal device,
wherein the random access resources comprise random access preambles and random access time-frequency resources, and the random access configuration information comprises a bitmap for indicating whether to allocate random access preambles for at least one of the network slices and a bitmap for indicating whether to allocate random access time-frequency resources for the at least one of the network slices.

9. The method of claim 8, wherein,
the random access configuration information is carried in a system message; or
the random access configuration information is carried in radio resource control (RRC) signaling.

10. The method of claim 8, wherein,
the random access preambles are allocated according to an ascending order of identifiers of the network slices; or
the random access preambles are allocated according to a descending order of the identifiers of the network slices.

11. The method of claim 8, wherein,
the random access time-frequency resources are allocated according to an ascending order of identifiers of the network slices; or
the random access time-frequency resources are allocated according to a descending order of the identifiers of the network slices.

12. The method of claim 8, wherein,
the network slices comprise default network slices; or
the random access configuration information is further used for indicating a correspondence between a random access resource and a random access performed due to a non-data-transmission service.

13. The method of claim 12, wherein the non-data-transmission service comprises at least one of following:

tracking area update, uplink time advance acquisition, or radio access network notification area update.

14. A terminal device comprising:
a processor;
a transceiver connected to the processor; and
a memory for storing instructions executable for the processor;
wherein the processor is configured to load and execute the executable instructions to perform operations comprising:
receiving random access configuration information, wherein the random access configuration information is used for indicating that random access resources are allocated according to network slices; and
determining the random access resource according to the random access configuration information, wherein the random access resource is matched with a target network slice to be accessed by the terminal device,
wherein the random access resources comprise random access preambles and random access time-frequency resources, and the random access configuration information comprises a bitmap for indicating whether to allocate random access preambles for at least one of the network slices and a bitmap for indicating whether to allocate random access time-frequency resources for the at least one of the network slices.

15. The terminal device of claim 14, wherein,
the random access configuration information is carried in a system message; or
the random access configuration information is carried in radio resource control (RRC) signaling.

16. The terminal device of claim 14, wherein,
the random access preambles are allocated according to an ascending order of identifiers of the network slices; or
the random access preambles are allocated according to a descending order of the identifiers of the network slices.

17. The terminal device of claim 14, wherein,
the random access time-frequency resources are allocated according to an ascending order of identifiers of the network slices; or
the random access time-frequency resources are allocated according to a descending order of the identifiers of the network slices.

18. The terminal device of claim 14, wherein,
the network slices comprise default network slices; or
the random access configuration information is further used for indicating a correspondence between a random access resource and a random access performed due to a non-data-transmission service.

19. The terminal device of claim 18, wherein the non-data-transmission service comprises at least one of following:
tracking area update, uplink time advance acquisition, or radio access network notification area update.

20. The terminal device of claim 14, wherein the operations further comprise:
performing a random access using the random access resource.

* * * * *